Figures 1, 2:
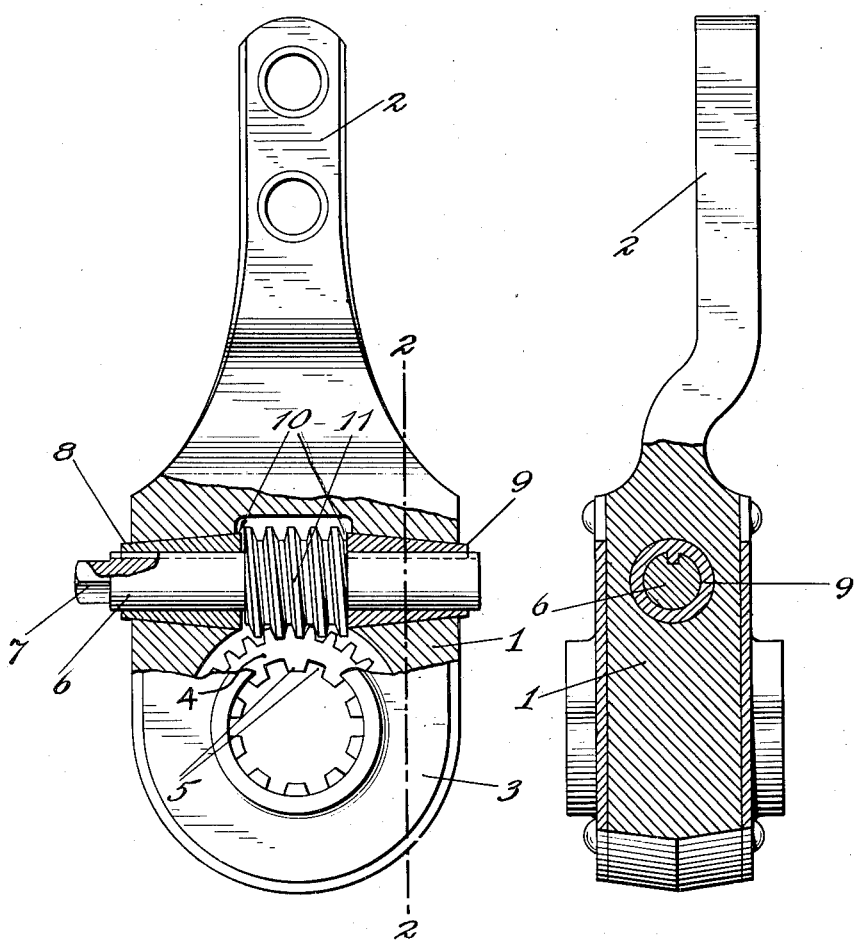

Aug. 2, 1949.  F. T. WARD  2,478,142
SLACK ADJUSTER
Filed July 3, 1947

INVENTOR
FRANK T. WARD
BY Darby & Darby
ATTORNEYS

Patented Aug. 2, 1949

2,478,142

BEST AVAILABLE COPY

UNITED STATES PATENT OFFICE

2,478,142

SLACK ADJUSTER

Frank Taylor Ward, Wilton, Conn.

Application July 3, 1947, Serial No. 758,789

4 Claims. (Cl. 74—522)

The invention herein disclosed is a part of a slack adjuster of the type commonly but not necessarily used on vehicles such as busses.

Automotive vehicles particularly are provided with a braking system in which the braking forces are applied through brake compression rods or tension cables actuated by hand operated levers, foot operated levers, by vacuum cylinders, and by air pressure chambers. Due to constant use of the brakes, normal wear occurs at the surface of the brake linings and the brake drums with a resultant necessity for increased travel of the actuating means in order to obtain effective braking. Unless this slack, as it is commonly termed, is taken up from time to time, eventually the actuating means will have reached the end of its allowable travel before the brake lining can contact the brake drum with sufficient force to accomplish the necessary braking. It is necessary, therefore, to interpose in these brake connections some simple and effective mechanism by means of which the length thereof can be adjusted for the purpose of equalizing as well as determining and maintaining the correct braking pressure on each wheel brake.

Slack adjusters for this purpose are known in a number of different forms which differ from each other mainly in an effort to provide a structure which will maintain its adjustment under normal operating conditions. Due to the severe strains of normal use and particularly of vibration, none of these devices are fully effective in preventing the adjusters from being reversely operated and thereby introducing slack into the brake connections. Various forms of locking devices have been incorporated in slack adjusters for preventing such reverse operation while facilitating it when desired but actual experience with them establishes their unreliability in this respect.

The main object of this invention is to provide an improved form of slack adjuster construction whereby under all normal conditions of use and under the most severe conditions of vibration slacking off of the adjuster is assuredly prevented.

This invention resides substantially in the combination, construction, arrangement and relative location of parts all as will hereinafter be described in detail.

In the accompanying drawings—

Figure 1 is an elevational view of a slack adjuster shown partly in cross section embodying the novel structure of this invention; and Figure 2 is a detailed cross sectional view taken on the line 2—2 of Figure 1.

As illustrated, many of the parts of the adjuster into which the novel features of this invention have been incorporated are of a well known type. Thus, the device includes the main housing portion 1 having an integral extension or arm 2, by means of which it is connected at one end to the actuating mechanism that applies the brakes, and a pair of cover plates 3. The housing 1 is recessed to form a chamber for a wormwheel 4 which has a splined central aperture 5 in which is entered a shaft which serves, when rotated, to force the braking surface against the brake drum.

Extending transversely of the housing 1 above the gear recess is a passage in which is mounted the worm 11. This worm is mounted on a double-ended shaft 6 so that it must rotate with the shaft. The shaft is provided at one end with a wrench formation 7. The housing 1 is further recessed to provide space for the worm 11 which space intersects the space in which the wormwheel 4 lies. Splined or keyed upon the double-ended shaft 6 are a pair of bearing sleeves 8 and 9 which are of frustro-conical formation. The main body portion is provided with oppositely facing conical seats in which the sleeves 8 and 9 lie.

The taper of the sleeves must have a small enough angle to lock them tightly when forced into the tapered recesses. For example, the taper of the sleeves may be that of standard Morse taper sockets or standard taper shank twist drills, namely, 0.6 inch per foot. This figure is given as one suitable for the purpose without intending to provide a limitation in this respect.

With such a device installed into the brake system of a vehicle it will be seen that when a wrench is applied to the end 7 of the shaft 6 and that shaft rotated that the worm 11 will turn, causing rotation of the wormwheel 4. This wormwheel is splined at 5 to a shaft which, upon rotation in one direction, eventually causes the brake shoes to come in contact with the brake drum and upon rotation in the other direction creates a gap between the brake shoes and the brake drum. This gap is the slack which increase as the brake shoes and brake drum wear, and which it is the purpose of this device to eliminate. As will be well understood, when the arm 2 effects the rotation of the main housing 1 the worm 11 and its shaft 6 is prevented from moving longitudinally by the wormwheel 4 until the slack 10 between the wormwheel 11 and either bearing sleeve 8 or bearing sleeve 9 is taken up, whereupon the wormwheel 4 and the shaft to which it is splined will also rotate with arm 2 until the gap between the brake shoes and the drum is closed thereby stopping further movement of arm 2. As the brake actuating means still continues to apply pressure tending to rotate arm 2, bearing sleeve 8 or 9, depending upon the direction of rotation of arm 2, is forced into its conical seat in housing 3 securely locking itself against rotation therein. When the wear between the brake shoes and the brake drum again produces an undesirable gap, this gap can again be reduced by applying a wrench to the wrench formation 7 on shaft 6. If bearing sleeve 8 or 9 is so securely locked in housing 3 that shaft 6 cannot be turned by the wrench, it is merely necessary to tap the protruding end of bearing sleeve 8 or 9, as the case may be, with a hammer thereby loosening it so as to permit adjustment with the wrench. Obviously, after the adjustment has been completed the first application of the brake will lock bearing sleeve 8 or 9 in its conical seat. Assume, for example, that this reaction causes the worm 11 to be forced to the right, Figure 1, as the slack is taken up. It follows that the sleeve 9 will be forced more tightly into its conical seat. Both sleeves 8 and 9 of course revolve with the shaft 6 and the attached worm 11 because of the splined connection between the sleeves and the shaft 6. Therefore, although the shaft 6 can slide longitudinally in the sleeves 8 and 9 they must turn with it. As the sleeve 9 is forced into its seat it will of course add to the resistance to rotation of the shaft 6 by the wrench attached to its end 7. This resistance, however, it not enough to prevent taking up the slack to any desired degree. The shifting of the shaft 6 to the right will leave the clearance indicated at 10 between the loose sleeves 8 and the worm 11. In a new structure this clearance is of the order of 1/1000 of an inch.

As is well known, the efficiency of gearing of this type is of no importance and the teeth on the worm and wormwheel are designed in so far as is possible so as to have a non-reversible driving relationship. For this reason, of course the tendency of the device to slack off in use and under vibration and jarring normally encountered is resisted to a considerable degree. However, this resistance to reverse operation is not sufficient without some additional help. As explained above, the various forms of locking devices, detents and the like which have been employed for the purpose have not been sufficient to prevent slacking off with the result that in bus operation, for example, the dangerous condition not infrequently results of the operator not being able to apply the brakes with the required full force.

Whenever it is desired for any reason to slack off the brake, one need only tap on the end of the tight sleeve, in the case of the description, the sleeve 9, which projects beyond the housing as shown, to release the shaft 6.

The sleeve 8 which operates in the opposite direction is provided so as to adapt the adjuster for either right or left hand operation. The end of the sleeve 8 is exposed so that it too can be lightly tapped to unseat it when it is desired to slack off the brake connections. Thus, the device can be used to take up slack in either rotation direction.

An advantage of this arrangement is its extreme simplicity and elimination of special locking devices which in themselves might be the source of maintenance difficulties. Another feature is the ruggedness of the structure and its effectiveness in providing the additional resistance to slacking off necessary to meet all operating conditions likely to be encountered over long periods of operation. Another feature is the inherent tendency of the locking sleeves automatically to lock whenever the brakes are applied.

From the above description, it will be apparent that the particular structure herein selected for the purpose of illustration is capable of considerable variation in its details without departure from the novel features exemplified herein and I do not therefore desire to be limited to the illustrated embodiment but only as required by the claims granted me.

What is claimed is:

1. In a slack adjuster, a lever forming a housing, a wormwheel rotatably mounted in said housing, a shaft extending transversely of the axis of said wormwheel and having a worm thereon meshing with said wormwheel and a pair of externally conical sleeves splined to said shaft on opposite sides of said worm, said housing having conical seats for said sleeves.

2. In the structure of claim 1, said sleeves and seats converging away from said worm.

3. A slack adjuster comprising a support, a meshing worm and wormwheel rotatably mounted on said support, said worm having shaft extensions rotatable therewith and externally conical sleeves splined on said shaft extensions and lying in conical seats in said support, axial movement of said worm in either direction due to the reaction of the wormwheel on said worm causing axial movement on the corresponding sleeve to tightly lock it in its seat.

4. In the structure of claim 3, said sleeves and seats diverging towards said worm.

FRANK TAYLOR WARD.

REFERENCES CITED

The following references are of record in the file of this patent:

UNITED STATES PATENTS

| Number | Name | Date |
|--------|------|------|
| 1,726,591 | Smith | Sept. 3, 1929 |

FOREIGN PATENTS

| Number | Country | Date |
|--------|---------|------|
| 14,539 | Switzerland | May 29, 1897 |
| 89,104 | Germany | Nov. 20, 1896 |
| 113,136 | Germany | Apr. 15, 1899 |
| 449,159 | Germany | Sept. 6, 1927 |